(No Model.)
F. H. TURNER.
PULLEY.
No. 565,526. Patented Aug. 11, 1896.
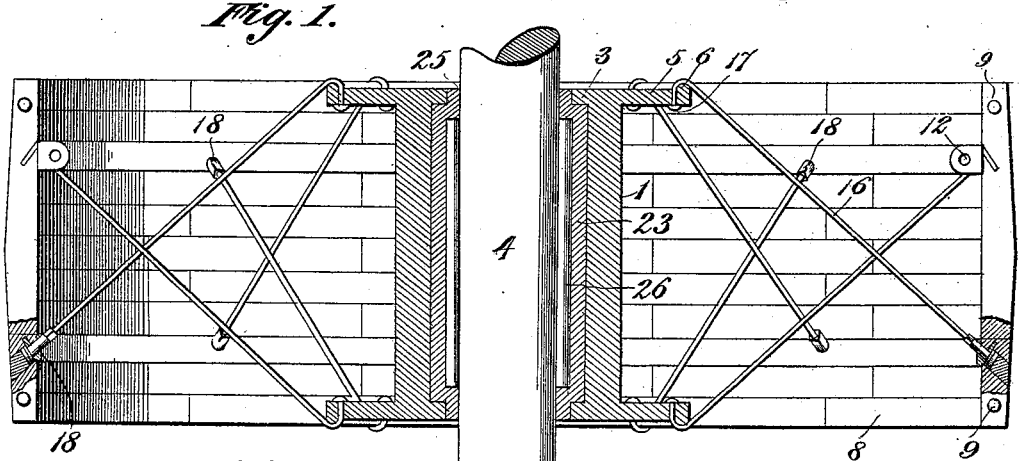
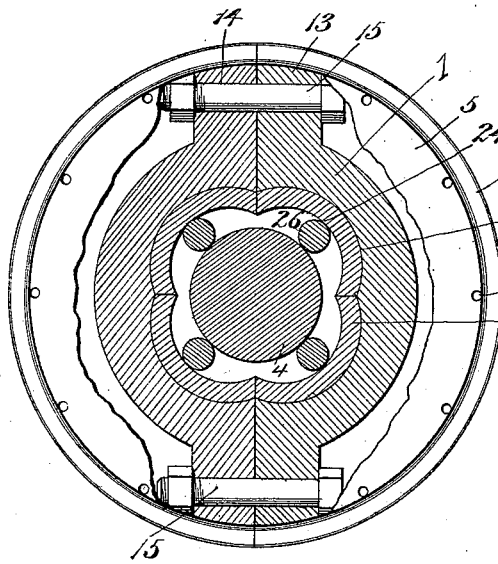
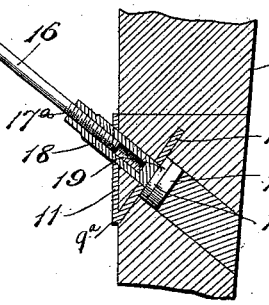
Attest
Edw. A. Duvall, Jr.
W. T. Duvall
Inventor
F. H. Turner.
By M. A. Duvall, Atty.

UNITED STATES PATENT OFFICE.

FRED H. TURNER, OF STATESVILLE, NORTH CAROLINA.

PULLEY.

SPECIFICATION forming part of Letters Patent No. 565,526, dated August 11, 1896.

Application filed May 14, 1895. Serial No. 549,300. (No model.)

*To all whom it may concern:*

Be it known that I, FRED H. TURNER, a citizen of the United States, residing at Statesville, in the county of Iredell and State of North Carolina, have invented certain new and useful Improvements in Pulleys; and I do hereby declare the following to be a full, clear, and exact description of the invention, such as will enable others skilled in the art to which it appertains to make and use the same.

My invention relates to improvements in pulleys, the objects in view being to produce a pulley of cheap and simple construction which is adapted for use upon different standard sizes of shafts, which is positive in its action, secure when operated, and which will grip evenly at all points upon the shaft when turned in either direction.

Other objects and advantages of the invention will hereinafter appear, and the novel features thereof will be particularly pointed out in the appended claims.

Referring to the drawings, Figure 1 is a radial sectional view of a pulley and the locking means, the two being constructed in accordance with my invention. Fig. 2 is a transverse sectional view of the hub, the locking means, and shaft. Fig. 3 is a sectional view of a portion of the pulley-rim and the outer end of one of the spokes, illustrating the manner of adjustably fastening the latter.

The pulley-hub 1, or it may be simply a hub or locking-sleeve 2, is bored somewhat larger than the shaft upon which it is to be used, and is provided at its opposite ends with inwardly-disposed annular flanges 3, which may have openings agreeing with the diameter of the shafts 4. In the preferred construction shown in Figs. 1 and 2, however, openings somewhat larger than the shaft 4 are thereby produced. Where used as a hub for a pulley, the opposite ends of the hub are also provided with external annular flanges 5, which on their outer faces are provided with superficial annular peripheral ribs 6, inside of which, at intervals, spoke-holes 7 are formed.

The hub is surrounded by the sectional wood rim 8, which like the hub is formed in opposite halves or sections, as is usual, one of said sections being provided with dowel-pins 9, designed to take into similar corresponding holes of the companion section. Near the opposite side edges of the pulley-rim sections V-shaped metal plates $9^a$ are embedded in the wood, the latter being built therein when the pulley is manufactured. The branch or flange 10 of each plate is disposed at an angle to the axis of the pulley, while the branch or flange 11 of each plate lies flat against the inner surface of the rim and is slightly longer and projects beyond its companion branch or flange 10. Such extended portions of the plates are bent abruptly at right angles, are perforated, and produce ears 12, which abut when the two rim-sections are assembled in position, bolts being passed through the perforated ears, whereby said rim-sections are secured together.

As before stated, the hub is also formed in sectional halves, and at their edges the halves are provided with angularly-disposed abutting securing-flanges 13, (see Fig. 2,) the same being provided with registering bolt-holes 14, through which bolts 15 are passed.

The spokes 16 are of light steel and are staggered, as shown, so that they cross. The inner ends of the spokes are headed, as at 17, and in advance of the same are passed from the inner sides of the flanges 5 through the perforations 7 and are bent over the rib 6. The outer extremities of the spokes are threaded, as indicated at $17^a$, and are engaged by the internal threads of socket-nuts 18, which are inclined through registering openings 19, with which the two branches 10 and 11 of the plates $9^a$ are provided. The inner ends of the socket-nuts 18 are squared to receive a wrench, while the outer ends of the said nuts 18 are provided with heads 20, washers 21 being interposed between said heads 20 and the branch or flange of the plate. It will thus be seen that the nuts are securely swiveled in position and can be operated upon by an ordinary wrench so as to draw more or less upon the steel spokes 16, thus retaining them taut and bracing the rim thoroughly.

The internal bore of the hub is formed with a series of segmental recesses 22, extending between the flanges 3 thereof and fitting the same, and located therein is a corresponding number of bushings 23, whose inner faces form a series of segmental binding-surfaces 24. The ends of the several bushings when assembled combine to produce a flanged opening 25, which fits loosely upon the shaft 4, and in turn is fitted by the flanges 3 of the hub.

As thus far described, it is obvious that the pulley is free to revolve upon the shaft 4, and in order to provide a means for locking upon the shaft I introduce between each of the binding-surfaces 24 and the shaft a roller 26, the diameter of which is about the same as the greatest width or distance between the binding-surface and the shaft, so that a slight turn of the pulley in either direction will cause all of the rollers to become wedged between the binding-surfaces and the shaft, whereby the said shaft is securely gripped and the pulley caused to move therewith, and vice versa.

The segmental bushings may be formed in one or more parts, and are preferably removable, so that by withdrawing one set and inserting another of a different thickness another shaft of a standard gage can be accommodated. As a matter of fact, the bushings can be omitted altogether and the binding-surface produced by the hub.

From the foregoing description, in connection with the accompanying drawings, it will be seen that I have produced and presented a very strong simply-constructed pulley wherein the strain is equally divided or transmitted over the entire rim, that I have provided a convenient means for securing the rim-sections together, and, furthermore, for adjusting the steel spokes and securing them in position. It will also be seen that the locking mechanism involved is capable of being adapted most readily for shafts of different diameters, that its action is most positive in either direction, that it grips the shaft at all points of contact to a like degree, and its parts are easily replaced when repair is required and necessitated from wear.

I would also have it understood that I do not limit my invention to the exact details of construction herein described and illustrated, but hold that I may vary the same to any degree and extent within the knowledge of the skilled mechanic without departing from the principle or sacrificing the advantages of the invention.

Having thus fully described my invention, what I claim is—

1. The combination with a pulley-rim, and a V-shaped metallic plate seated therein and having its opposite branches provided with alining perforations, and threaded sockets seated therein, of an inner hub having end flanges, and a series of spokes secured to said flanges and at their outer ends threaded in the sockets, substantially as specified.

2. The combination with the rim of a pulley, a metallic V-shaped plate seated therein and extending around the inner face thereof, and provided at intervals with perforations in its opposite branches that aline with similar openings in the outer surface of the pulley-rim, a series of headed internally-threaded sockets arranged in the perforations, washers between the heads thereof and the plates, a hub and a series of spokes secured to the hub and threaded at their outer ends in the sockets, substantially as specified.

3. The combination with opposite pulley-rim sections, a pair of metallic V-shaped plates seated in the sections, one of the branches of each plate being longer than its companion branch and inwardly turned and perforated to form pairs of abutting ears, and bolts passed therethrough, of a hub and spokes extending therefrom and secured to the said rims, substantially as specified.

4. The combination with the opposite pulley-rim sections, an inner hub and pairs of metallic V-shaped plates seated in the sections, the inner branch of each plate being extended beyond its companion branch, inwardly bent and perforated, of bolts passed through the perforated ears, and spokes secured to the hub and to the aforesaid ribs, substantially as specified.

5. The combination with a shaft, of a surrounding hub larger than and mounted thereon and having its ends provided with internal flanges, and between the same provided with axially-disposed crescent or arc shaped recesses, similarly-shaped bushings arranged removably in the recesses, and having end flanges embracing the shaft and embraced by the flanges of the hub, and provided between the ends with crescent or arc shaped binding-surfaces, and a series of rollers located between the same and the shaft and having diameters equal to the greatest distance between the said binding-surfaces and the shaft, substantially as specified.

In testimony whereof I affix my signature in presence of two witnesses.

FRED H. TURNER.

Witnesses:
R. L. FLANIGAN,
C. M. STEELE.